(12) United States Patent
Matsuoka et al.

(10) Patent No.: US 11,488,238 B2
(45) Date of Patent: Nov. 1, 2022

(54) ARRANGEMENT SYSTEM FOR TRIAL USE OR TRIAL FITTING VEHICLE

(71) Applicant: Toyota Jidosha Kabushiki Kaisha, Toyota (JP)

(72) Inventors: Tomohito Matsuoka, Nagoya (JP); Seiichi Tsunoda, Nisshin (JP); Jiro Goto, Seto (JP); Masayuki Yamada, Chofu (JP); Yasutaka Eto, Okazaki (JP); Keima Fukunaga, Toyota (JP); Kinya Tagawa, Tokyo (JP); Yasuhiro Sasaki, Tokyo (JP); Sho Tanaka, Tokyo (JP); Yuki Shinohara, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 276 days.

(21) Appl. No.: 16/227,687

(22) Filed: Dec. 20, 2018

(65) Prior Publication Data
US 2019/0197606 A1   Jun. 27, 2019

(30) Foreign Application Priority Data

Dec. 26, 2017   (JP) .............................. JP2017-250208

(51) Int. Cl.
*G06Q 30/00*   (2012.01)
*G06Q 30/06*   (2012.01)

(52) U.S. Cl.
CPC ..... *G06Q 30/0643* (2013.01); *G06Q 30/0631* (2013.01)

(58) Field of Classification Search
CPC ........... G06Q 30/0643; G06Q 30/0641; G06Q 30/0631

USPC ................................................ 705/26.1–27.2
See application file for complete search history.

(56) References Cited

U.S. PATENT DOCUMENTS

| 9,378,607 | B1* | 6/2016 | Wine ................. | G06Q 30/0201 |
| 2012/0298688 | A1* | 11/2012 | Stiernagle ............ | G06Q 10/087 221/155 |
| 2014/0129951 | A1* | 5/2014 | Amin ................. | G06Q 30/0621 715/738 |

FOREIGN PATENT DOCUMENTS

| CN | 104823436 A | 8/2015 |
| JP | 2002-007908 A | 1/2002 |
| JP | 2002-049801 A | 2/2002 |
| JP | 2002-059777 A | 2/2002 |
| JP | 2016-062415 A | 4/2016 |
| WO | 2014/074407 A1 | 5/2014 |

(Continued)

OTHER PUBLICATIONS

S. Pendleton et al., "Autonomous golf cars for public trial of mobility-on-demand service,"2015 IEEE/RSJ International Conference on Intelligent Robotsand Systems (IROS), 2015, pp. 1164-1171, doi: 10.1109/IROS.2015.7353517. (Year: 2015).*

*Primary Examiner* — Anand Loharikar
(74) *Attorney, Agent, or Firm* — Dinsmore & Shohl LLP

(57) ABSTRACT

An arrangement system of a vehicle that permits a user to perform a trial use or a trial fitting of a product in a vehicle interior includes a display unit configured to display products that are candidates for purchase, an operation unit configured to be operated by the user to select a desired product from the products displayed on the display unit, and a vehicle arrangement unit configured to arrange the vehicle on which the product selected through an operation performed on the operation unit is loaded.

4 Claims, 9 Drawing Sheets

(56) References Cited

FOREIGN PATENT DOCUMENTS

WO 2016117080 A1 7/2016

* cited by examiner

ARRANGEMENT SYSTEM FOR TRIAL USE OR TRIAL FITTING VEHICLE

CROSS-REFERENCE TO RELATED APPLICATION

This application claims priority to Japanese Patent Application No. 2017-250208 filed on Dec. 26, 2017, incorporated herein by reference in its entirety.

BACKGROUND

The present disclosure relates to an arrangement system for a trial use or trial fitting vehicle.

A mail order system accepts an order for a product from a computer terminal such as a personal computer (PC) or a portable information terminal through the Internet line. For example, Japanese Laid-Open Patent Publication No. 2002-49801 describes a system that specifies products using product codes to reduce the frequency of incorrect order placement of the products.

If a user believes there is a discrepancy between a product they viewed on a computer screen and the delivered product, the user may need to perform cumbersome procedures to return the product. Therefore, there is a demand that the system described above reduce situations in which discrepancies occur to increase the convenience for the user.

SUMMARY

An object of the present disclosure is to provide an arrangement system for a trial use or trial fitting vehicle that increases the convenience for the user by providing the user with an opportunity for a trial use or a trial fitting of a product before the user purchases the product.

One aspect of the present disclosure is an arrangement system of a vehicle that permits a user to perform a trial use or a trial fitting of a product in a vehicle interior. The arrangement system includes a display unit configured to display products that are candidates for purchase, an operation unit configured to be operated by the user to select a desired product from the products displayed on the display unit, and a vehicle arrangement unit configured to arrange the vehicle on which the product selected through an operation performed on the operation unit is loaded.

One aspect of the present disclosure is an arrangement system of a vehicle that permits a user to perform a trial use or a trial fitting of a product in a vehicle interior. The arrangement system includes a display configured to display products that are candidates for purchase, an input device configured to be operated by the user to select a desired product from the products displayed on the display, and circuitry configured to arrange the vehicle on which the product selected through an operation performed on the input device is loaded.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION

First Embodiment

Hereinafter, a first embodiment of an arrangement system for a trial use or trial fitting vehicle will be described. In the present application, the term "trial use or trial fitting" refers to the user actually checking the product through five senses. For example, the term "trial use or trial fitting" refers to wearing or using clothes, accessories, or other various articles on a trial basis or to sample and taste food or drink.

Figure 1:
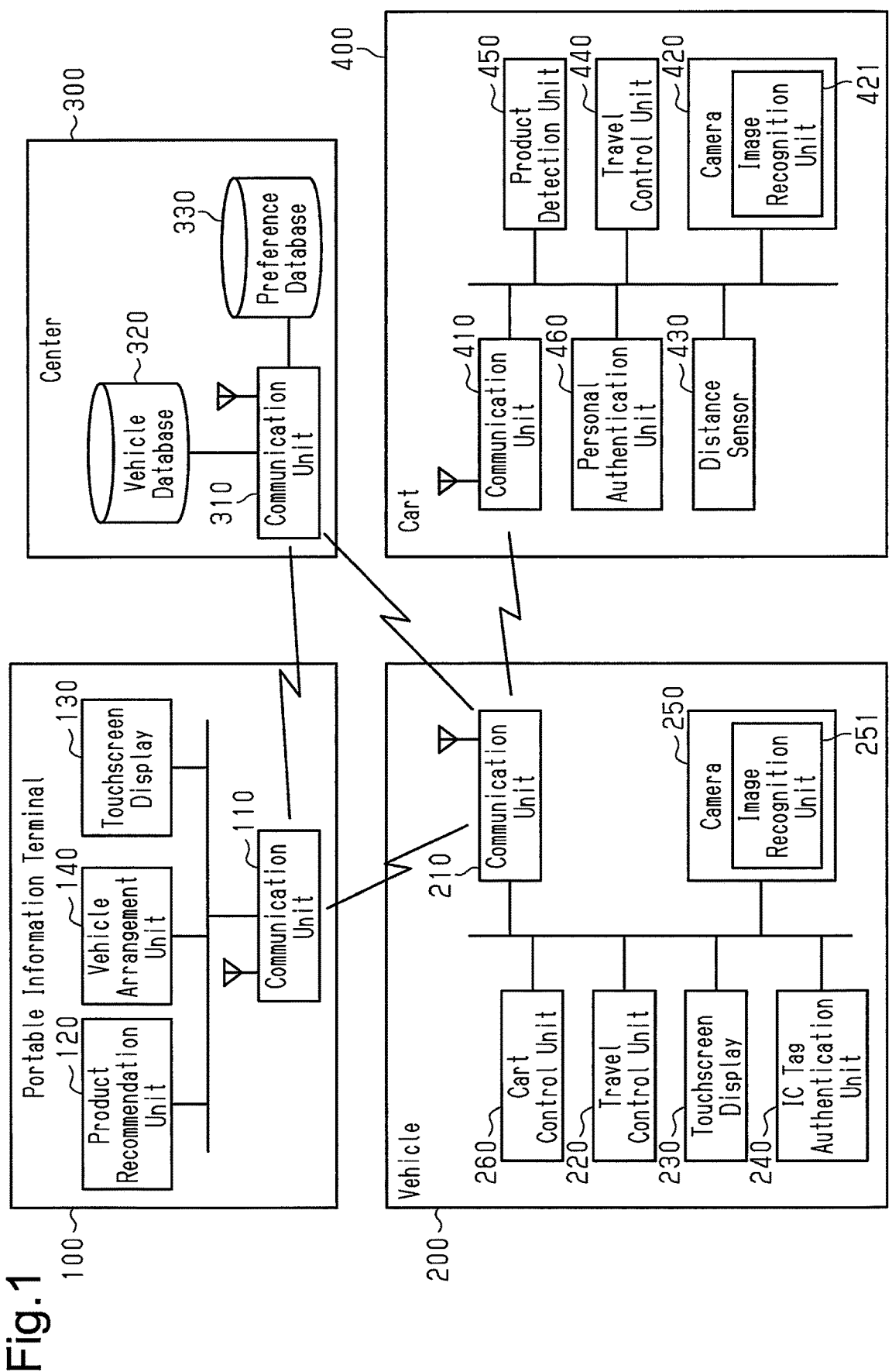
FIG. 1 is a block diagram showing a schematic configuration of a first embodiment of an arrangement system for a trial use or trial fitting vehicle.

FIG. 1 shows an arrangement system according to the first embodiment. Specifically, the user selects a product displayed on a display screen of a portable information terminal 100. The arrangement system arranges a vehicle 200 on which the selected product is loaded for the user of the portable information terminal 100. The user performs a trial use or a trial fitting of the product.

The portable information terminal 100 includes a communication unit 110, a product recommendation unit 120, a touchscreen display 130, and a vehicle arrangement unit 140. The touchscreen display 130 functions as a display unit and an operation unit.

The communication unit 110 is configured to communicate with a communication unit 310 of a center 300 and acquires various kinds of information from a database managed by the center 300. In the first embodiment, the center 300 includes a vehicle database 320 for managing travelling information of vehicles and a preference database 330 for managing preference information of users of portable information terminals 100. The vehicle database 320 and the preference database 330 are examples of a database.

The product recommendation unit 120 acquires preference information of a user managed in the preference database 330 of the center 300 through the communication unit 110 and recommends products that are candidates for purchase based on the acquired preference information of the user.

The touchscreen display 130 presents a selection screen of the products that are candidates for purchase recommended by the product recommendation unit 120 to the user of the portable information terminal 100.

When the user performs an operation on the touchscreen display 130 to select a desired product, the vehicle arrangement unit 140 sends a request to the center 300 for information about the vehicle on which the selected product is loaded. Then, the vehicle arrangement unit 140 acquires vehicle information managed in the vehicle database 320 of the center 300 through the communication unit 110 and arranges the vehicle 200 for the user based on position information of the vehicle 200 included in the acquired vehicle information.

The vehicle 200 includes a communication unit 210, a travel control unit 220, a touchscreen display 230, an integrated circuit (IC) tag authentication unit 240, a camera 250, and a cart control unit 260.

The communication unit 210 is configured to communicate with the communication unit 110 of the portable information terminal 100 and accepts a request for arrangement of the vehicle 200 from the portable information terminal 100.

The travel control unit 220 controls autonomous travelling of the vehicle 200. When accepting a request for arrangement of the vehicle 200 from the portable information terminal 100, the travel control unit 220 causes the vehicle 200 to travel in accordance with a travel route set between the position of the portable information terminal 100 and the position of the vehicle 200.

The touchscreen display 230 presents a selection screen of products that are candidates for purchase among the products loaded on the vehicle 200 to the user. The products that are candidates for purchase are each product loaded on the vehicles 200. The type of product loaded on each vehicle 200 may be different from the type of product loaded on other vehicles 200 or may include the same type as other vehicles 200.

The IC tag authentication unit 240, which is a non-contact type sensor arranged at the entrance of the vehicle 200, authenticates an IC tag attached to a product to detect movement of the product from the inside of the vehicle to the outside of the vehicle and movement of the product from the outside of the vehicle to the inside of the vehicle.

The camera 250 captures an image of a vehicle interior, and an image recognition unit 251 performs image recognition process on the captured image to detect the position of a passenger riding on the vehicle 200.

The cart control unit 260 is configured to communicate with one or more carts 400 arranged in the vehicle interior. The cart control unit 260 recognizes the position of the cart 400 in the vehicle interior and controls the movement of the cart 400 in the vehicle interior and the arrangement of the cart 400 in the vehicle interior.

Each cart 400 includes a communication unit 410, a camera 420, a distance sensor 430, a travel control unit 440, a product detection unit 450, and a personal authentication unit 460.

The communication unit 410 is configured to communicate with the communication unit 210 of the vehicle 200 and acquires information on movement control of the cart 400 including the communication unit 410 from the cart control unit 260.

The camera 420 captures an image of the vehicle interior from the viewpoint of the cart 400, and an image recognition unit 421 performs an image recognition process on the captured image to detect the position of the passenger present around the cart 400.

The distance sensor 430 is a non-contact type sensor that detects the distance between the passenger detected by the camera 420 and the cart 400 including the distance sensor 430.

The travel control unit 440 controls the autonomous travelling of the cart 400 including the travel control unit 440 to maintain a predetermined distance between the passenger detected by the distance sensor 430 and the cart 400 including the travel control unit 440.

The product detection unit 450 detects whether or not a product is loaded on the cart 400 and detects the loading of a product on the cart 400 including the product detection unit 450 and the removal of a product from the cart 400.

When the product detection unit 450 detects the removal of a product from the cart 400, the personal authentication unit 460 authenticates a passenger present around the cart 400 as the passenger who is handling the product through a predetermined authentication process. The authentication process is, for example, vein authentication, face authentication, or iris authentication.

The arrangement system includes various control devices, for example, the product recommendation unit 120 and the vehicle arrangement unit 140 of the portable information terminal 100; the travel control unit 220 and the cart control unit 260 of the vehicle 200; the center 300; and the travel control unit 440, the product detection unit 450, and the personal authentication unit 460 of the cart 400. The various control devices may be configured as circuitry including 1) one or more processors operating in accordance with a computer program (software), 2) one or more dedicated hardware circuits such as an application specific integrated circuit (ASIC) that executes at least some of various processes, or 3) a combination of these. The processor includes a CPU as well as a memory such as a RAM and a ROM. The memory stores program codes or commands configured to cause the CPU to execute the processes. The memory, that is, a computer readable medium, includes various usable media that can be accessed with a general-purpose or dedicated computer.

Next, the transition of the display screen of the portable information terminal 100 when the vehicle 200 is arranged through operation of the portable information terminal 100 will be described.

Figure 2:
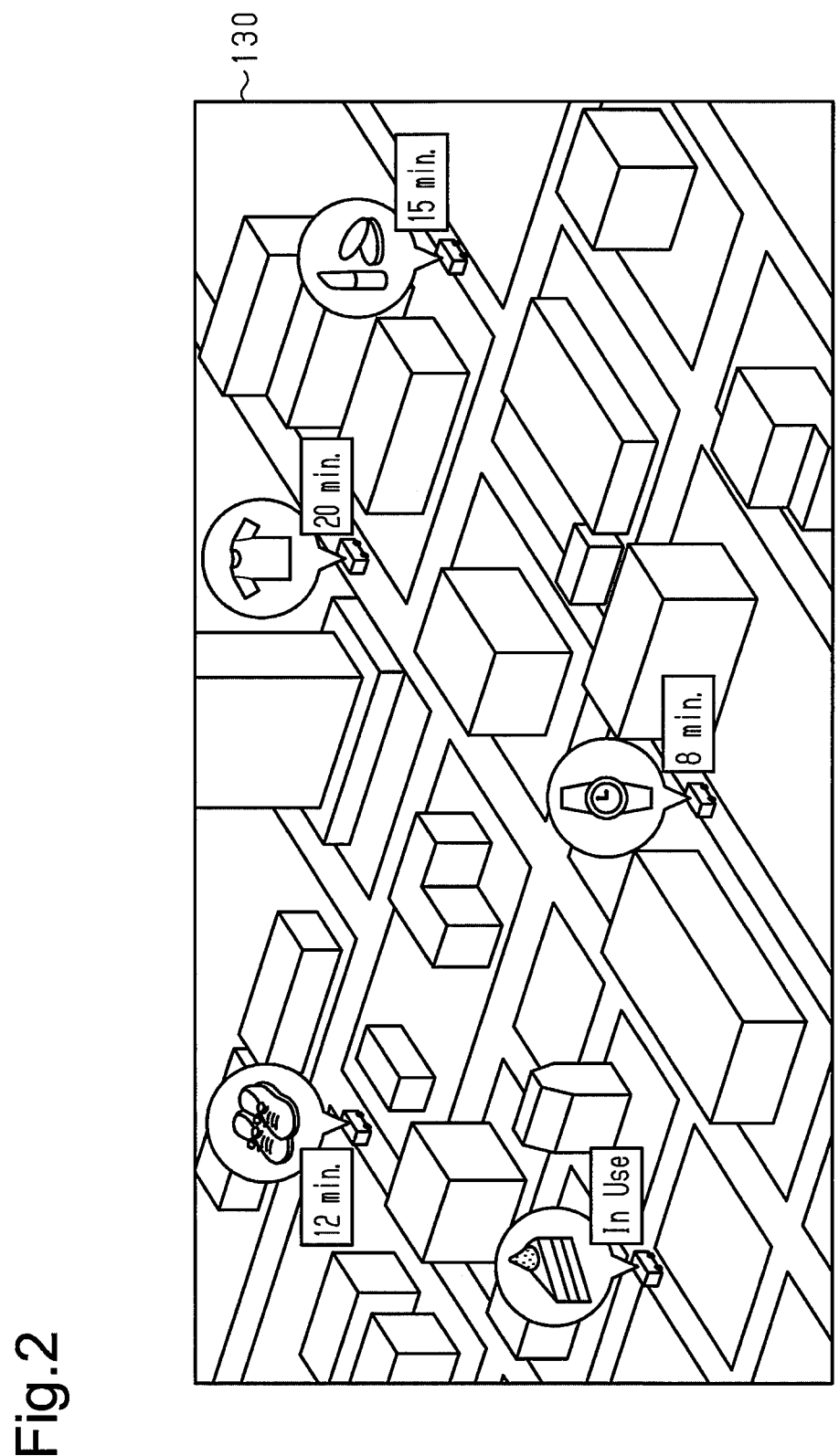
FIG. 2 is a schematic diagram showing an example of map data in which positions of vehicles on which recommended products are loaded are displayed.

As shown in FIG. 2, the portable information terminal 100 displays, on the touchscreen display 130, map data indicating positions of the vehicles 200 on which products recommended by the product recommendation unit 120 are loaded. At this time, the portable information terminal 100 displays an image of the product loaded on each vehicle 200 in association with the display position of the image of the vehicle 200. The portable information terminal 100 displays a predicted amount of time the vehicle 200 will take to arrive at the position of the user in association with the display position of the image of the vehicle 200. The predicted amount of time is calculated with reference to a travel distance of the vehicle 200 along the travel route set based on the position of the user and the position of the vehicle 200. At this time, when the travel route includes a road closure section, an alternative travel route is searched for, and the predicted amount of time is calculated with reference to a travel distance of the vehicle 200 along the alternative travel route. An alternative travel route may be searched for based on time of day during which the section is closed. More specifically, if the road closure is not present in a particular section at the time when the vehicle 200 is scheduled to pass through the section, the travel route may be searched for including the section. Additionally, when another user is using a target vehicle 200, the portable information terminal 100 displays an image as a sign indicating that the vehicle 200 is in use in association with the display position of the image of the vehicle 200.

Figure 3:
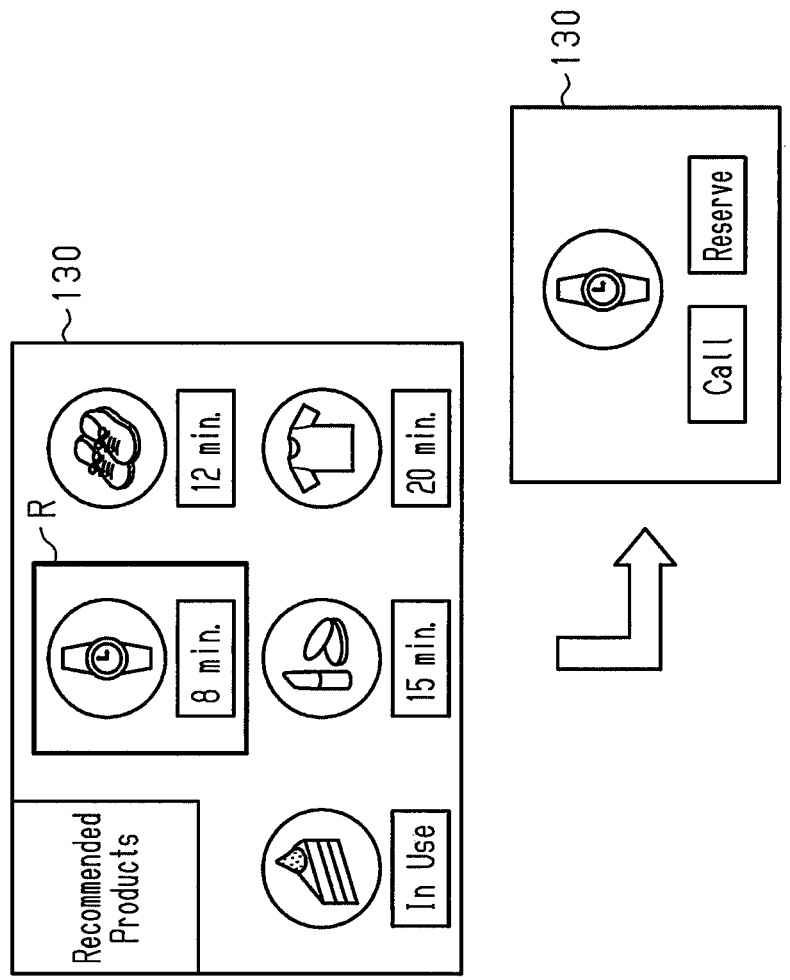
FIG. 3 is a schematic diagram showing an example of a selection screen of products.

As shown in FIG. 3, a selection screen of products is displayed on the touchscreen display 130 through operation of the portable information terminal 100. In detail, the touchscreen display 130 displays images of selectable products beside predicted amounts of time the vehicles on which the products are loaded will take to arrive. When a particular product is surrounded by a selection frame R and the user has confirmed the selection of the product through a determination operation, the portable information terminal 100 displays a display screen for arranging the vehicle 200 on which the relevant product is loaded. The process of arranging the vehicle 200 includes a process of immediately calling the vehicle and a process of reserving the arrangement of the vehicle.

Next, a flow of processes of arranging the vehicle 200 through operation of the portable information terminal 100 in the first embodiment will be described.

Figure 4:
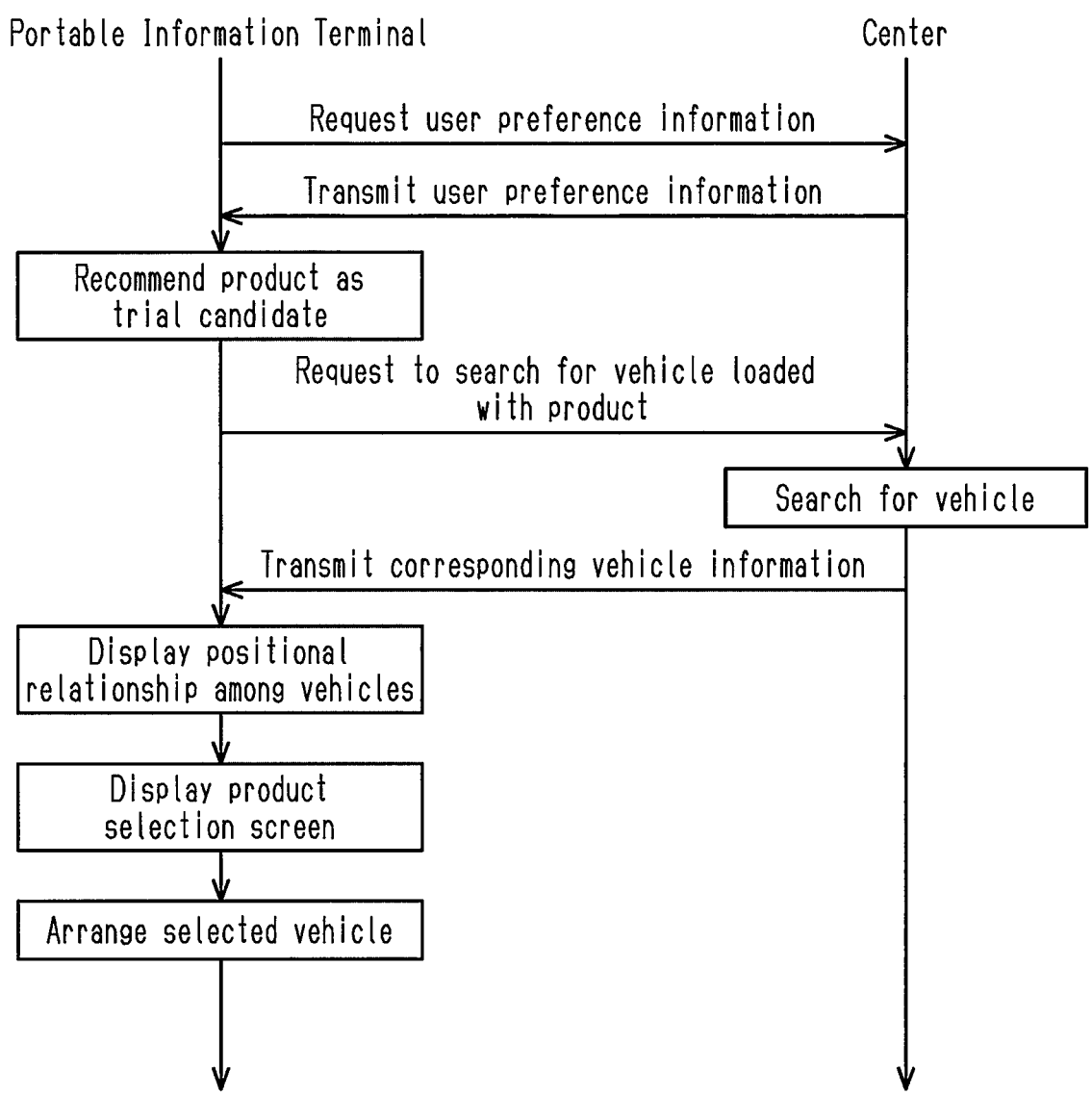
FIG. 4 is a sequence chart showing a flow of processes executed by the arrangement system of FIG. 1 up to arrangement of a vehicle.

As shown in FIG. 4, the portable information terminal 100 sends a request to the center 300 for preference information of the user of the portable information terminal 100. The center 300 then retrieves the preference information of the user corresponding to the request from the preference information managed in the preference database 330 and transmits the retrieved preference information to the portable information terminal 100 that requested for the preference information.

The portable information terminal 100 recommends products that are candidates for purchase in accordance with the preference of the user. The portable information terminal 100 sends a request to the center 300 to search for the vehicles 200 on which the recommended products are loaded. The center 300 retrieves the vehicle information of the vehicles 200 corresponding to the request from the vehicle information managed in the vehicle database 320 and transmits the retrieved vehicle information to the portable information terminal 100 that sent the request to search for the vehicles 200.

Then, the portable information terminal 100 displays map data indicating positions of the vehicles 200 on the touchscreen display 130 based on the position information of the vehicles 200 included in the vehicle information received from the center 300.

The portable information terminal 100 switches the display screen of the touchscreen display 130 to the selection screen of the products. When a product is selected on the selection screen, the portable information terminal 100 arranges the vehicle 200 on which the product is loaded.

Next, a flow of processes when a user performs a trial use or a trial fitting of a product loaded on the vehicle 200 in the first embodiment will be described.

Figure 5:
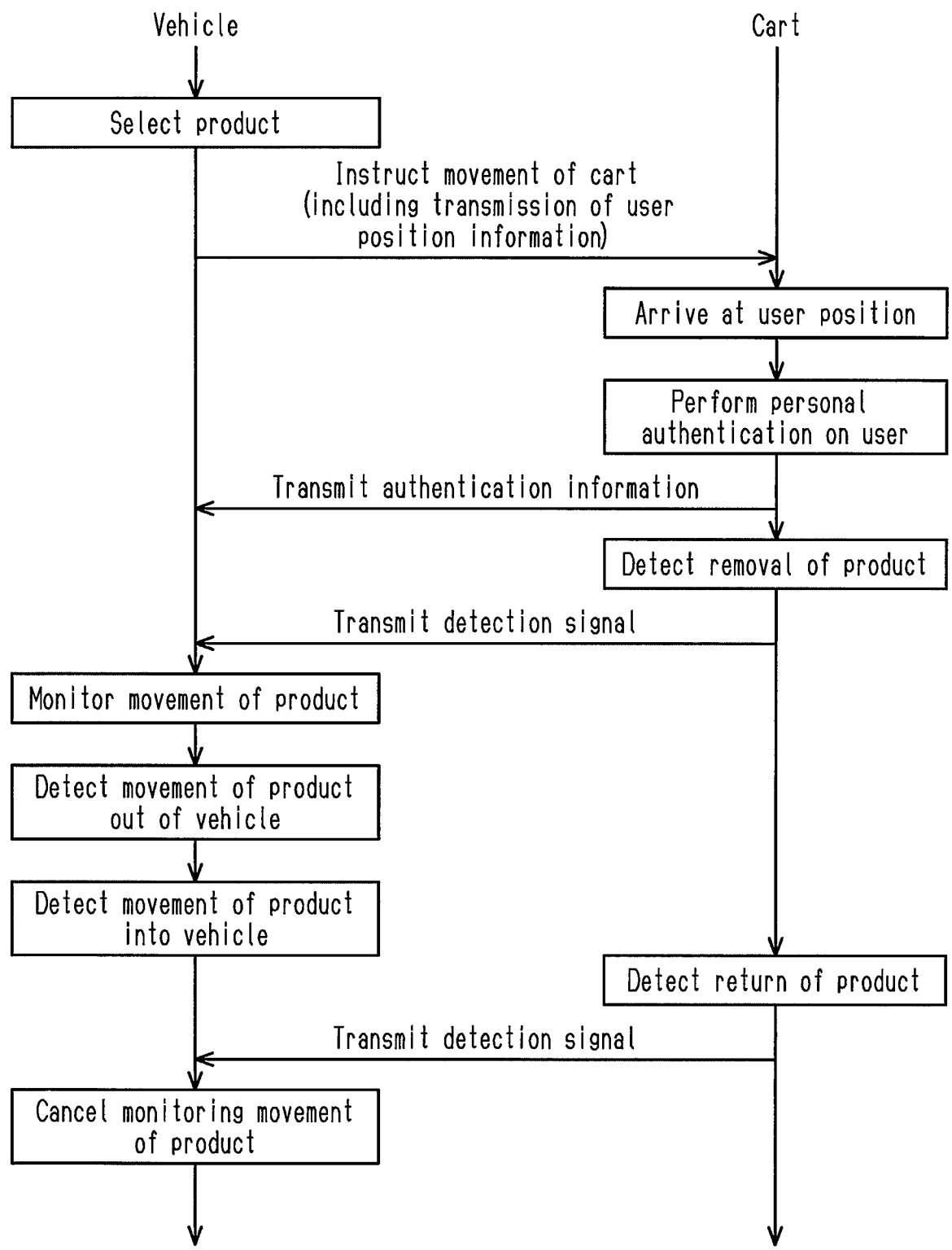
FIG. 5 is a sequence chart showing a flow of processes executed by the arrangement system of FIG. 1 up to a user performing a trial use or a trial fitting of a product.

As shown in FIG. 5, in the vehicle 200, a product to be purchased is selected through operation of the touchscreen display 230.

The vehicle 200 sends an instruction to move the cart 400 corresponding to the selected product. At this time, the vehicle 200 also transmits position information of the user in the vehicle interior detected by the camera 250 to the cart 400.

The cart 400 autonomously travels in the vehicle interior to approach the user based on the position information of the user received from the vehicle 200. Upon arriving at a position close to the user, the cart 400 performs personal authentication on the user through the personal authentication unit 460. At this time, the cart 400 transmits authentication information obtained through the personal authentication of the user to the vehicle 200.

When the product detection unit 450 detects removal of the product, the cart 400 transmits a detection signal indicating the removal of the product to the vehicle 200. Specifically, the cart 400 transmits the identification number of the product associated with the identification number of the cart 400 to the vehicle 200 together with the detection signal.

Upon receiving the detection signal indicating the removal of the product from the cart 400, the vehicle 200 monitors movement of the product through the camera 250.

When the user gets off the vehicle with the product for trial use or trial fitting, the vehicle 200 detects movement of the product to the outside of the vehicle through the camera 250.

When the user completes the trial use or the trial fitting of the product and returns to the inside of the vehicle, the vehicle 200 detects movement of the product to the inside of the vehicle through the camera 250.

When the user returns the product for trial use or trial fitting, the cart 400 detects the return of the product through the product detection unit 450 and transmits a detection signal indicating the return of the product to the vehicle 200.

Upon receiving the detection signal indicating the return of the product from the cart 400, the vehicle 200 cancels the monitoring of movement of the product through the camera 250.

As described above, the first embodiment has the following advantages.

(1) Without designating a vehicle 200 loaded with a product desired by the user beforehand, the vehicle 200 loaded with the product is arranged. The user performs a trial use or a trial fitting of the product by boarding on the vehicle 200 on which the product is loaded. This provides opportunities for a trial use or a trial fitting of products before purchase of the products through mail order without inconveniencing the user.

(2) When the user selects a product, a predicted amount of time the corresponding vehicle 200 will take to arrive at the position of the user is displayed. Thus, the vehicle 200 can be arranged in conformity with expectations of the user.

(3) Products that are candidates for purchase are recommended in accordance with the preference of the user. This allows the user to effectively select a product matching the preferences of the user.

(4) The positions of the vehicles 200 on which products that are candidates for purchase are loaded are displayed. This allows the user to intuitively visualize a predicted amount of time each vehicle 200 loaded with the product will take to arrive at the position of the user.

(5) The image of the product loaded on the vehicle 200 is displayed in association with the display position of the image of the vehicle 200. The travelling position of the vehicle 200 and the type of product loaded on the vehicle 200 can be easily associated with each other on the display screen of the touchscreen display 130.

Second Embodiment

Next, a second embodiment of an arrangement system for a trial use or trial fitting vehicle will be described. The second embodiment is different from the first embodiment in that the vehicle has a door lock mechanism 270. Therefore, in the following description, the configuration that is different from the first embodiment will be mainly explained, and redundant explanation on the configuration same as or equivalent to the configuration of the first embodiment will be omitted.

Figure 6:
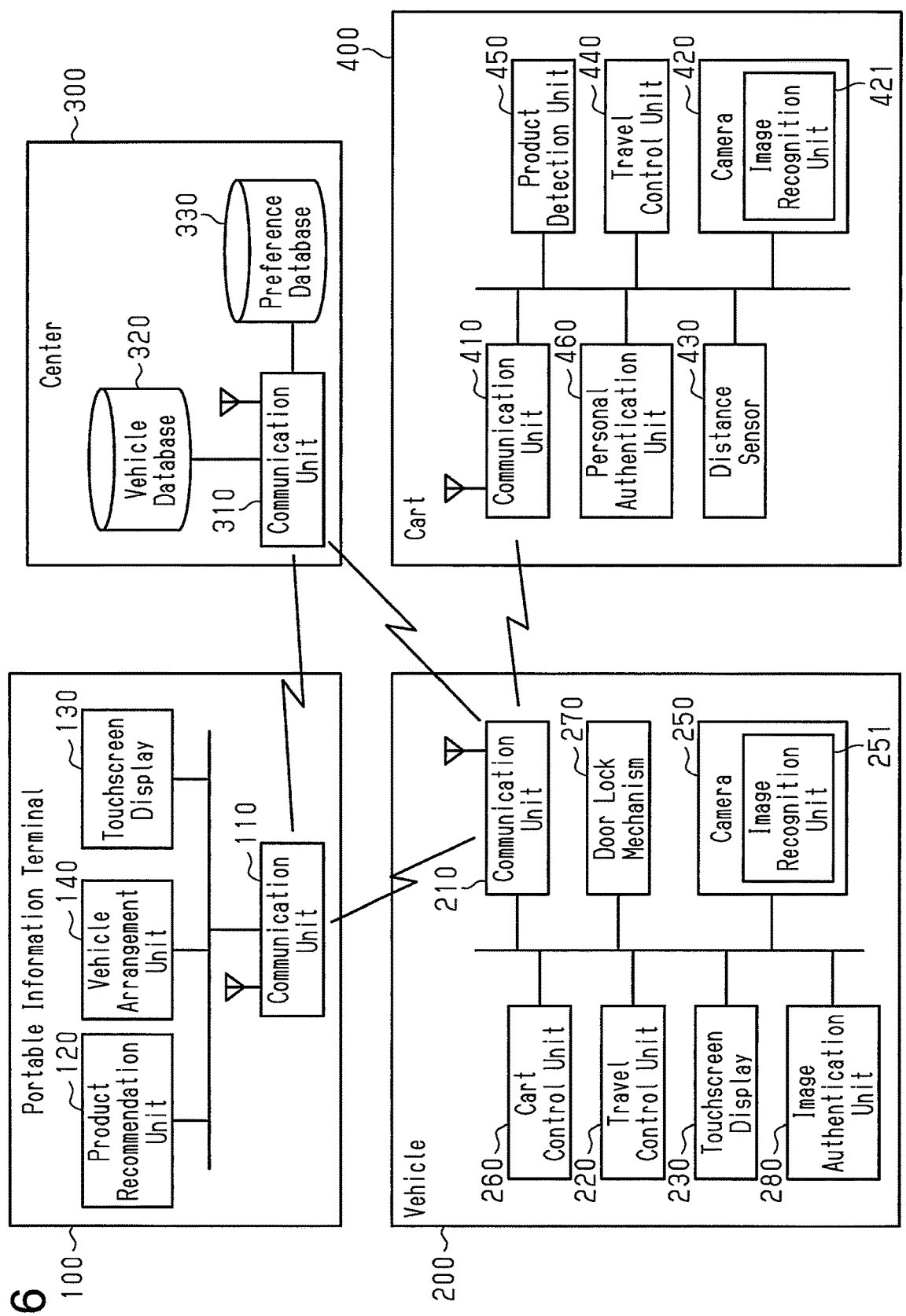
FIG. 6 is a block diagram showing a schematic configuration of an arrangement system for a trial use or trial fitting vehicle according to a second embodiment.

As shown in FIG. 6, in the second embodiment, the vehicle 200 further includes a door lock mechanism 270 in addition to the communication unit 210, the travel control unit 220, the touchscreen display 230, the camera 250, and the cart control unit 260. Furthermore, the vehicle 200 includes an image authentication unit 280 instead of the IC tag authentication unit 240.

When the product detection unit 450 detects removal of the product from the cart 400, the door lock mechanism 270 switches the vehicle door to the locked state.

The image authentication unit 280 authenticates a product by performing an image recognition process on the product. The image recognition process may be, for example, machine learning with data associating the shape of the product and the type of the product as teacher data to authenticate the product from the image of the product.

Then, when the product is authenticated by the image authentication unit 280, the door lock mechanism 270 cancels the locked state of the vehicle door through the door lock mechanism 270.

Next, in the second embodiment, a flow of processes when a user performs a trial use or a trial fitting of a product loaded on the vehicle 200 will be described.

Figure 7:
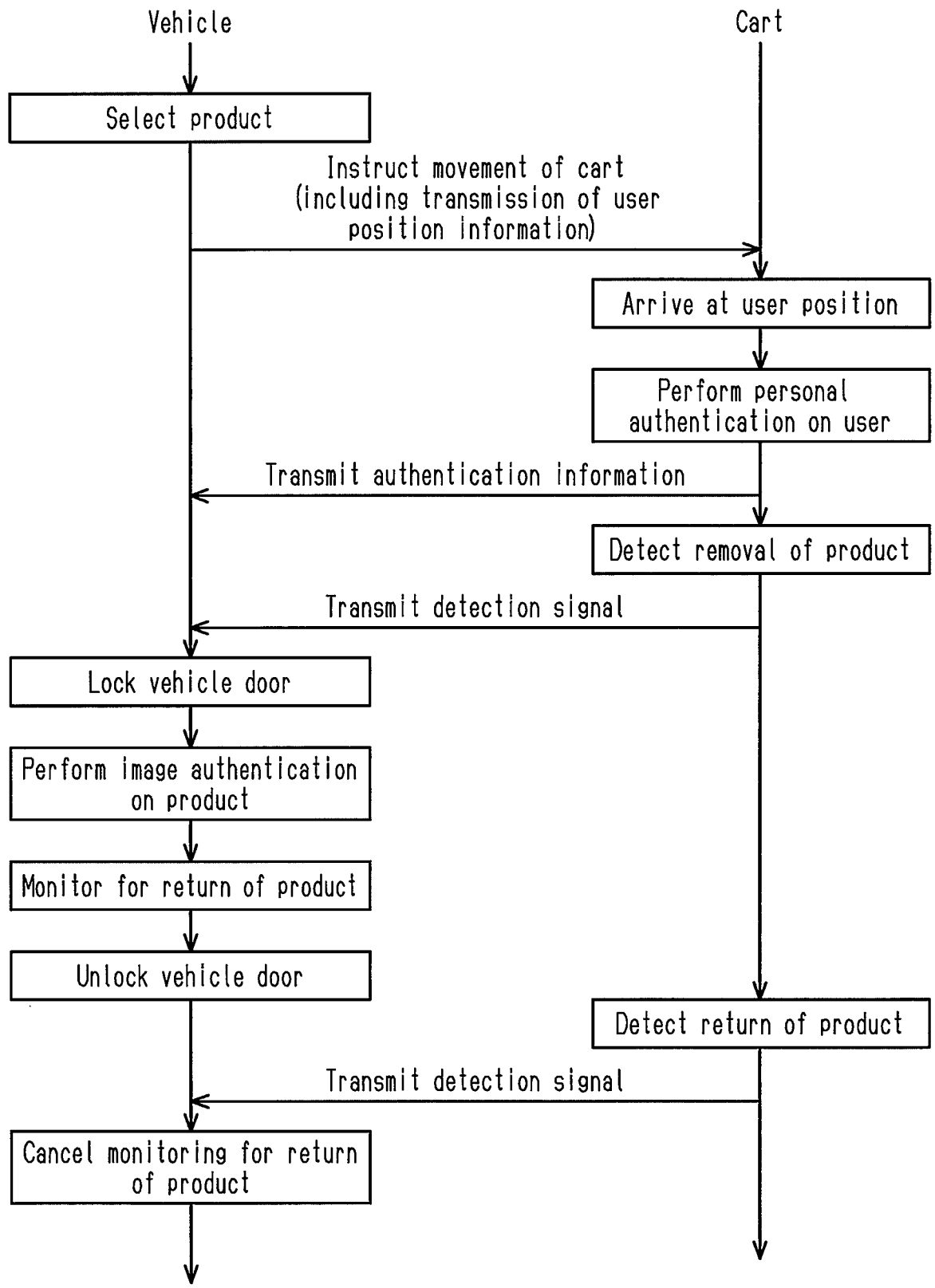
FIG. 7 is a sequence chart showing a flow of processes executed by the arrangement system of FIG. 6 up to a user performing a trial use or a trial fitting of a product.

As shown in FIG. 7, in the vehicle 200, a product to be purchased is selected through operation of the touchscreen display 230.

The vehicle 200 sends an instruction to move the cart 400 corresponding to the selected product. At this time, the vehicle 200 also transmits position information of the user detected by the camera 250 to the cart 400.

The cart 400 autonomously travels to approach the user based on the position information of the user received from the vehicle 200. Upon arriving at a position close to the user, the cart 400 performs the personal authentication on the user through the personal authentication unit 460. The cart 400 transmits the authentication information obtained through the personal authentication of the user to the vehicle 200.

When the product detection unit 450 detects removal of the product, the cart 400 transmits a detection signal indicating the removal of the product to the vehicle 200. Specifically, the cart 400 transmits the identification number of the product associated with the identification number of the cart 400, to the vehicle 200 together with the detection signal.

Upon receiving the detection signal indicating the removal of the product from the cart 400, the vehicle 200 switches the vehicle door to the locked state through the door lock mechanism 270.

Then, the vehicle 200 performs image authentication on the product through the image authentication unit 280. At this time, after starting monitoring for the return of the authenticated product, the vehicle 200 releases the locked state of the vehicle door through the door lock mechanism 270.

When the user returns the product for trial use or trial fitting, the cart 400 detects the return of the product through the product detection unit 450 and transmits a detection signal indicating the return of the product to the vehicle 200.

Upon receiving the detection signal indicating the return of the product from the cart 400, the vehicle 200 cancels the monitoring for the return of the product through the camera 250.

As described above, the second embodiment has the following advantages in addition to the advantages (1) to (5) of the first embodiment.

(6) The vehicle door is switched to the locked state at a point in time when the removal of the product from the cart 400 is detected. This prevents removal of the IC from the product and taking out of the product from the vehicle 200 without authorization.

(7) A product is specified through image authentication. Thus, an authentication subject such as an IC tag or a barcode does not have to be attached to the product. This simplifies the preparation process of products to be purchased.

Third Embodiment

Next, a third embodiment of an arrangement system for a trial use or trial fitting vehicle will be described. The third embodiment differs from the first embodiment in that the content of products to present to a user who gets on the vehicle is changed in accordance with the preference of the user. Therefore, in the following description, the configuration that is different from the first embodiment will be mainly explained, and redundant explanation on the configuration same as or equivalent to the configuration of the first embodiment will be omitted.

Figure 8:
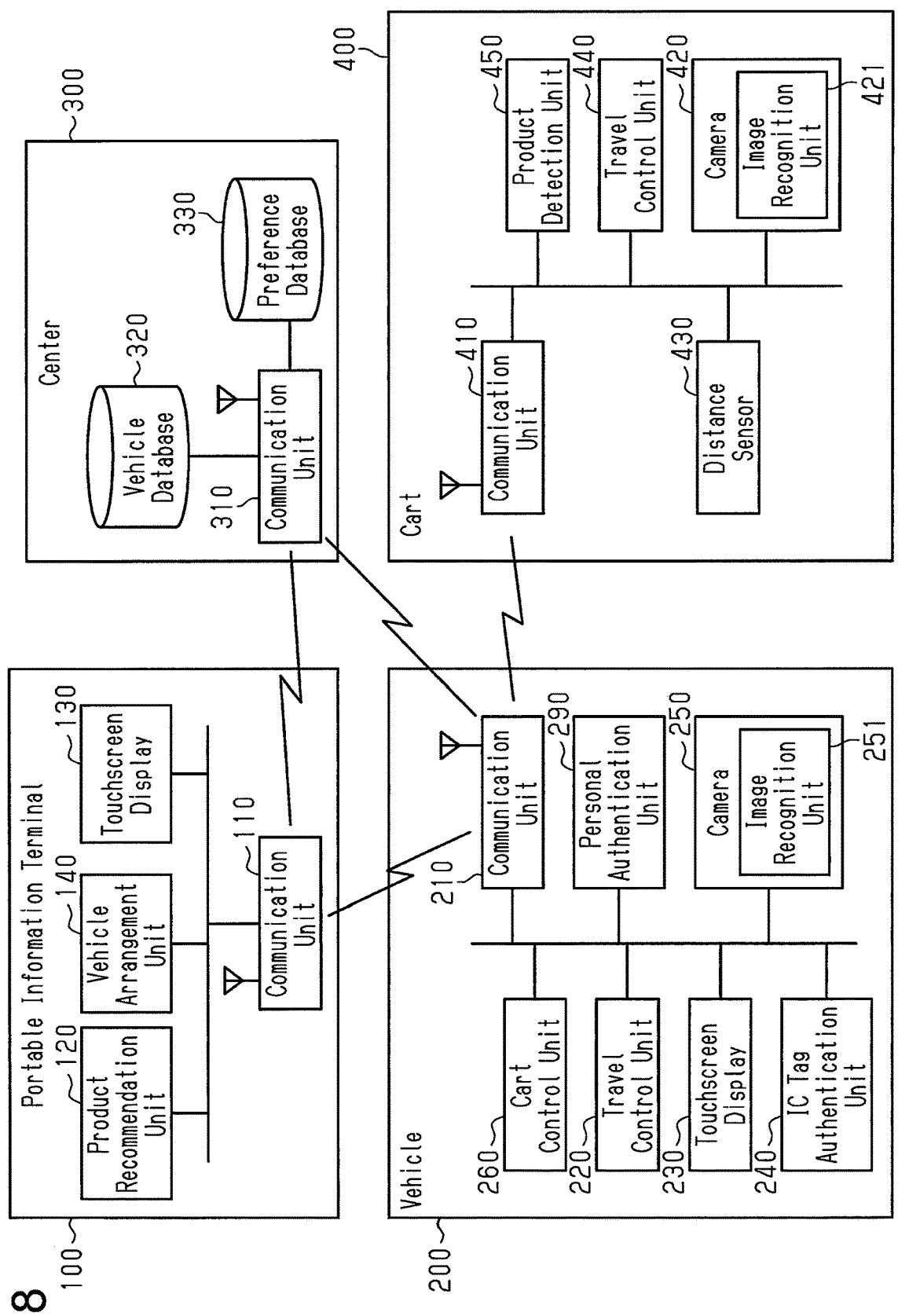
FIG. 8 is a block diagram showing a schematic configuration of an arrangement system for a trial use or trial fitting vehicle according to a third embodiment.

As shown in FIG. 8, in the third embodiment, the vehicle 200 further includes a personal authentication unit 290, in addition to the communication unit 210, the travel control unit 220, the touchscreen display 230, the IC tag authentication unit 240, the camera 250, and the cart control unit 260. Additionally, the third embodiment differs from the first embodiment in that the cart 400 does not include the personal authentication unit 460.

Next, in the third embodiment, a flow of processes when a user performs a trial use or a trial fitting of a product loaded on the vehicle 200 will be described.

Figure 9:
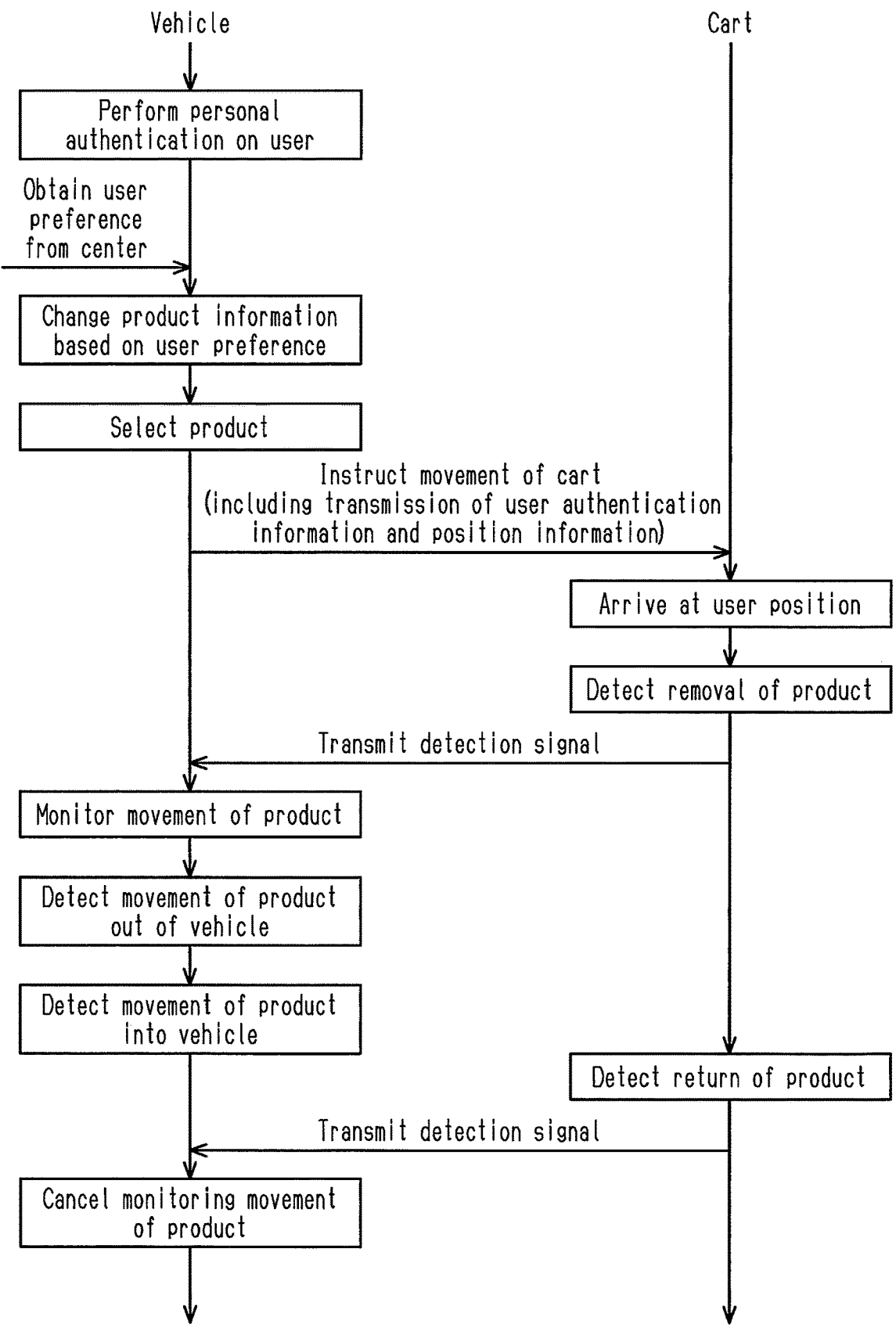
FIG. 9 is a sequence chart showing a flow of processes executed by the arrangement system of FIG. 8 up to a user performing a trial use or a trial fitting of a product.

As shown in FIG. 9, the vehicle 200 performs personal authentication on the user through the personal authentication unit 290. When the personal authentication is performed on the user, the vehicle 200 may further acquire characteristic information of the user (e.g., height, body size, foot size of the user). In addition, the vehicle 200 may move the cart 400 on which a product suitable for the user is loaded toward the position of the user based on the acquired characteristic information.

Then, the vehicle 200 acquires preference information corresponding to the authenticated user from the center 300. Specifically, the center 300 retrieves preference information corresponding to the user from the preference information managed in the preference database 330 and transmits the preference information to the vehicle 200.

The vehicle 200 changes the arrangement of products displayed on the touchscreen display 230 in accordance with the preference of the user.

In the vehicle 200, with the arrangement of the products changed, a product to be purchased is selected through operation of the touchscreen display 230.

The vehicle 200 sends an instruction to move the cart 400 corresponding to the selected product. At this time, the vehicle 200 also transmits the position information of the user detected by the camera 250 to the cart 400. Additionally, the vehicle 200 transmits the authentication information of the user authenticated by the personal authentication unit 290 to the cart 400.

The cart 400 autonomously travels to approach the user based on the position information of the user received from the vehicle 200.

When the product detection unit 450 detects removal of the product, the cart 400 transmits a detection signal indicating the removal of the product to the vehicle 200. When transmitting the detection signal to the vehicle 200, the cart 400 transmits the identification number of the product associated with the identification number of the cart 400 to the vehicle 200 together with the authentication information of the user described above.

Upon receiving the detection signal indicating the removal of the product from the cart 400, the vehicle 200 monitors movement of the product through the camera 250.

When the user gets off the vehicle with the product for trial use or trial fitting, the vehicle 200 detects movement of the product to the outside of the vehicle through the camera 250.

When the user completes the trial use or the trial fitting of the product and returns to the inside of the vehicle, the vehicle 200 detects movement of the product to the inside of the vehicle through the camera 250.

When the user returns the product for trial use or trial fitting, the cart 400 detects the return of the product through the product detection unit 450 and transmits a detection signal indicating the return of the product to the vehicle 200.

Upon receiving the detection signal indicating the return of the product from the cart 400, the vehicle 200 cancels the monitoring of movement of the product through the camera 250.

As described above, the third embodiment has the following advantage in addition to the advantages (1) to (5) of the first embodiment.

(8) The arrangement of products displayed on the touchscreen display 230 is changed in accordance with the preference of the user. Therefore, when the user gets on the vehicle 200 and performs a trial use or a trial fitting of a product, the product that matches the preference of the user can be easily and conveniently selected.

Other Embodiments

Each of the above embodiments can be implemented in the following modes.

In each of the above embodiments, the portable information terminal 100 displays an image of a product loaded on the vehicle 200 in association with the display position of the image of the vehicle 200. Alternatively, the portable information terminal 100 may change the display mode of the image of the vehicle 200, for example, by changing the color of the image of the vehicle 200 in accordance with the type of product loaded on the vehicle 200. The image of the vehicle 200 merely needs to be displayed so that the product loaded on the vehicle 200 can be identified. The display mode of the image of the vehicle 200 does not need to be changed in accordance with the product loaded on the vehicle 200.

In each of the above embodiments, the portable information terminal 100 displays the position of the vehicle, on which the product that is a candidate for purchase is loaded, on the map data. Alternatively, the portable information terminal 100 may display the position of the vehicle and the position of the user on the map data. Furthermore, the portable information terminal 100 does not necessarily need to display the position of the vehicle on the map data, and for example, may display a list of a distance between the position of the user and the position of each vehicle 200. In short, the relative position relationship between the user and the vehicle 200 merely needs to be displayed.

In each of the above embodiments, the portable information terminal 100 displays a recommended product that is a candidate for purchase in accordance with the preference of the user. Alternatively, the portable information terminal 100 may display a recommended product that is a candidate for purchase in accordance with popularity of the product by general users. The portable information terminal 100 merely needs to give priority to displaying a product that the user is highly likely to wish to purchase. Furthermore, the portable information terminal 100 may change the product to recommend in accordance with, for example, the external environment such as season, time of day, and weather. The portable information terminal 100 may uniformly fix the arrangement of products on the display screen without recommending a product that is a candidate for purchase.

In each of the above embodiments, the portable information terminal 100 displays a predicted amount of time the vehicle 200, on which the product is loaded, will take to arrive at the position of the user. Alternatively, the portable information terminal 100 may display a scheduled time at which the vehicle 200, on which the product is loaded, is to arrive at the position of the user. The portable information terminal 100 may divide vehicles 200 into groups in accordance with the predicted amount of time it will take for each vehicle 200, on which the product is loaded, to arrive at the position of the user. The portable information terminal 100 may change the display mode of the images of the vehicles 200 for each divided group, for example, by changing the color of the images of the vehicles 200 for each divided group.

In each of the above embodiments, the portable information terminal 100 arranges the vehicles 200 so that the vehicle 200 on which the product selected by the user is loaded travels to the position of the user. Alternatively, when there are multiple candidates for the vehicle 200 on which the product selected by the user is loaded, the portable information terminal 100 may determine the vehicle 200 that travels to the position of the user based on various conditions such as the predicted amount of time that each vehicle 200 would take to arrive at the position of the user.

In the second embodiment described above, the vehicle 200 authenticates a product from an image of the product using machine learning. Alternatively, the vehicle 200 may read a marker such as a barcode attached to the product or a Quick Response (QR) code (registered trademark) to authenticate the product. The vehicle 200 merely needs to be able to authenticate the product through image recognition process on the product.

In each of the above embodiments, the vehicle 200 captures an image of the vehicle interior through the camera 250, thereby preventing theft of products to be purchased. Alternatively, after movement of a product to the outside of the vehicle is detected, when movement of the product into the vehicle is not detected within a time limit, the vehicle 200 may output a warning from the portable information terminal 100 carried by the user.

In each of the above embodiments, the vehicle 200 loads a product on the cart 400 having the autonomous travelling function. Alternatively, the vehicle 200 may load a product on a stationary product shelf.

In each of the above embodiments, the portable information terminal 100 arranges the vehicle 200 so that the vehicle 200 loaded with the product is directed toward the position of the user. Alternatively, the portable information terminal 100 may arrange the vehicle 200 so that the vehicle 200 loaded with the product is directed toward a position specified in advance. The vehicle 200 may be arranged through an information processing terminal (e.g., personal computer (PC)) carried by the user.

In each of the above embodiments, the touchscreen display 130 functions as the display unit and the operation unit. Alternatively, while a display function as the display unit, and an input device different from the display may function as the operation unit. That is, the display unit and the operation unit may be integrated or may be separate bodies.

Therefore, the present examples and embodiments are to be considered as illustrative and not restrictive and the disclosure is not to be limited to the details given herein, but may be modified within the scope and equivalence of the appended claims.

The invention claimed is:

1. An arrangement system of a vehicle that permits a user to perform a trial use or a trial fitting of a product in a vehicle interior, the arrangement system comprising a display unit and an input device communicatively coupled to a processor configured to:
　display products on the display unit that are candidates for purchase;
　receive a selection, from the input device, of a desired product from the products displayed on the display unit;
　display map data indicating a position of a vehicle on which a product that is a candidate for purchase is loaded;
　display, on the display unit, at the position of the vehicle indicated on the displayed map data a first image of the vehicle indicating a present location of the vehicle, on which the product that is the candidate for purchase is loaded, and a second image of a product loaded on the vehicle, wherein the second image is displayed as a graphical extension of the displayed first image; and
　cause, via circuitry configured to control the vehicle in accordance with a travel route set between the present location of the vehicle and a position of the user, the vehicle on which the product selected is loaded to travel to the position of the user.

2. The arrangement system according to claim 1, wherein the processor is further configured to display a predicted amount of time that the vehicle, on which the product selected is loaded, will take to arrive at the position of the user.

3. The arrangement system according to claim 1, wherein the processor is further configured to recommend a product that is a candidate for purchase in accordance with a preference of the user.

4. The arrangement system according to claim 1, wherein the display unit and the input device comprise a touchscreen display.

* * * * *